J. H. Wittmer
Hay Press.
N° 90,039. Patented May 11, 1869.
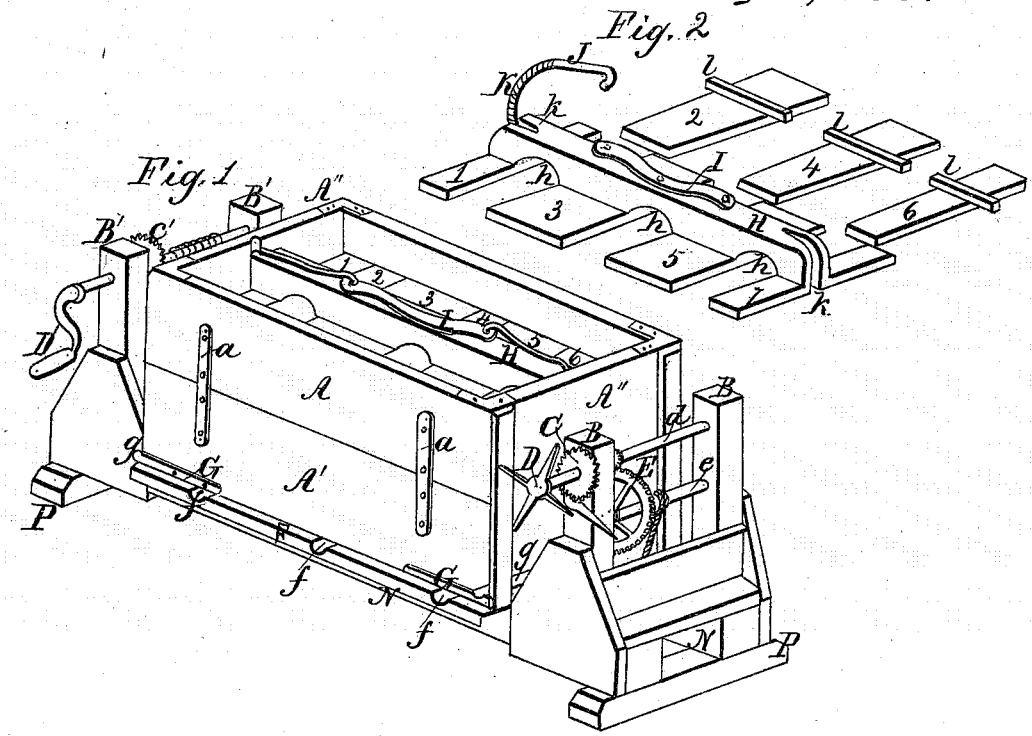
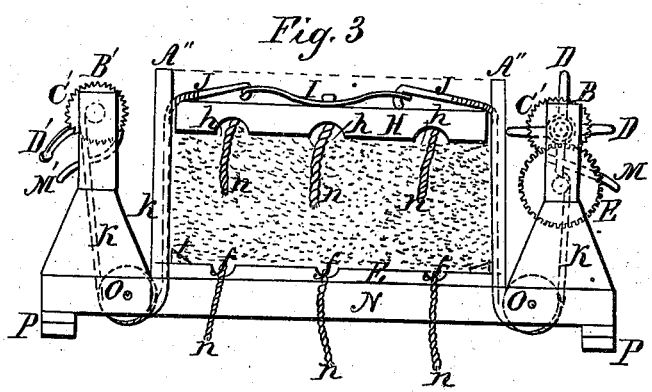
Witnesses
Benjm Shertzer
Jno A Smith
Inventor
J. H. Wittmer

United States Patent Office.

JACOB H. WITTMER, OF MANOR, PENNSYLVANIA, ASSIGNOR TO HIMSELF AND WILLIAM SIPLE, OF SAME PLACE.

Letters Patent No. 90,039, dated May 11, 1869.

IMPROVED POWER-PRESS FOR HAY, &c.

The Schedule referred to in these Letters Patent and making part of the same.

*To all whom it may concern:*

Be it known that I, JACOB H. WITTMER, of Manor, in the county of Lancaster, and State of Pennsylvania, have invented new and useful Improvements in Power-Presses for Hay, Tobacco, &c.; and I hereby declare that the following is a full, clear, and exact description of the construction and operation of the same, reference being had to the accompanying drawings, making a part of this specification, in which—

Figure 1 is a perspective view of the press in operation, with all the parts in place.

Figure 2, the lid removed and slide-pieces drawn out.

Figure 3 is a longitudinal elevation, to illustrate the relative position of the machinery employed, the same letters referring to the same parts shown by fig. 1.

The nature of my invention consists in the arrangement of the parts, and is so constructed as to effect the pressure within a stout box, to remove the box without relaxing the pressure, and effectually tie or secure the bale or bundle, so pressed, before the pressure is taken off, which is speedily performed.

To enable others skilled in the art to make and use my invention, a brief reference to the drawings will suffice.

Two stout beams, N N, of the desired length and width apart, are laid longitudinally and parallel to each other.

End-sills or cross-pieces P P are also shown, to raise the beams from the ground.

A bed or bottom F, somewhat wider than the combined box A A' A".

This bottom has gauge-ledges, t, across it at each end, against which the inside of the box rests, and is fixed in its position.

This bottom has grooves f in the projecting edge, for straw bands or ropes n.

The bearings for the windlass and gear, are made at each end by the posts B B, and B' B'.

C C' are ratchet-wheels.

M M', the pawl or click.

D D', turning-handles.

On one end is shown a pinion, on the click-shaft of C'.

The shaft d is terminated by cross-handles D, and operates a cog-wheel E on a shaft, e, with a winding-drum, to which a cord or chain is affixed.

The other side shows simply a crank-handle, D', and click, c, with a rope around the shaft.

Either mode may be applied to both ends, or diverse, as shown.

The box A is set upon the bed or bottom E.

The rope or chain K, affixed by one end to the drum or shaft on each side, is passed under a grooved pulley, o, and carried up through the bottom F, and in a groove made in the inside of the ends A" of the box, centrally.

These ropes are terminated by hooks J, and can be thrown out over the edge of the box, while being filled, and the materials packed in.

When filled, the lid H, with its sliding pieces, 2, 4, and 6, in place, is laid upon the materials, and the hooks J inserted in the holes of the central spring or holding-plate I, on the binding-timber H of the combined lid, 1, 2, 3, 4, 5, 6, and 7.

The hooks being inserted, the cords K in notches in the ends of the centre beam, and descending vertically and centrally down the ends inside of the box, in its groove, by turning the handle or windlass, will draw the head down at both ends with all the power cords or chains will bear, and consequently any amount of pressure calculated for is had by this arrangement.

When the pressure is completed, and it is desirable to secure the material in a bale, it is necessary to remove the box. In order to relieve the external sides and allow the box to be removed with ease, it is made in two parts, A A', having spring plates or hinges *a a*, and latch and plate G *g* in the lower corners.

When unlatched, the box is loosened, and is easily lifted off, leaving the head H, and its connection with the hooks and ropes, intact with the full pressure upon the materials pressed within the box.

The slide pieces 2 4 6, fig. 2, are now withdrawn. When there is ample room to pass straw bands or ropes under the pressing-beam H, through the notch *h*, and openings of the lid, and when properly tied with those previously laid in the bottom, *n n*, &c., fig. 3, and thus secured, a simple tap on the hook-plate I will release the cords, and the bale or package is finished, and the press ready for a fresh charge.

The windlass, ratchets, pawls, and gear, are too common for description, and also the cords or chains and pulleys.

I am aware, through an examination just made, that a patent was granted November 10, 1868, No. 83,926, for a hay and cotton-press, wherein a certain described arrangement is claimed, all constructed and operating substantially as set forth.

The arrangement consists of a large flanged pulley or drive-wheel centrally between two beams, the outer ends of the shaft being provided with conic pulleys for the rope, which extends on each side, and outside the beams, over pulleys on the top, passing down to the sliding head, making an upward pressure.

I disclaim said arrangement and construction, and deem that mine differs substantially in the mode of applying the pressure.

I am not aware that a lid constructed and operating like mine was ever before known or used; therefore

What I claim, is—

The arrangement of the removable box A, placed upon the bed or bottom F, and having grooves on the inside ends, central beam H, notched at the ends, centrally provided with a catch-plate, I, and top boards, 1 3 5 7 affixed, having bevel sides for the reception of the loose pieces 2 4 6, hooks J, ropes K, passing under pulleys O, and operated by ratchet-wheels and pawls, supported by posts B B at both ends of the press, all constructed and operated as herein shown and described.

J. H. WITTMER.

Witnesses:
 BENJN. SHERTZER,
 JNO. A. BRUSH.